United States Patent
Zhang et al.

(10) Patent No.: US 11,377,542 B2
(45) Date of Patent: *Jul. 5, 2022

(54) THERMOPLASTIC POLYOLEFIN COMPOSITIONS USEFUL FOR ALDEHYDE ABATEMENT

(71) Applicant: Dow Global Technologies LLC, Midland, MI (US)

(72) Inventors: Yahong Zhang, Shanghai (CN); Jiguang Zhang, Shanghai (CN); Jian Zou, Shanghai (CN); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 293 days.

This patent is subject to a terminal disclaimer.

(21) Appl. No.: 16/617,342

(22) PCT Filed: May 22, 2018

(86) PCT No.: PCT/US2018/034107
§ 371 (c)(1),
(2) Date: Nov. 26, 2019

(87) PCT Pub. No.: WO2018/222460
PCT Pub. Date: Dec. 6, 2018

(65) Prior Publication Data
US 2021/0122904 A1    Apr. 29, 2021

(30) Foreign Application Priority Data

May 29, 2017 (WO) ................ PCT/CN2017/086488

(51) Int. Cl.
| | | |
|---|---|---|
| C08L 23/12 | (2006.01) | |
| C08F 220/28 | (2006.01) | |
| C08F 2/18 | (2006.01) | |
| C08F 2/38 | (2006.01) | |
| C08F 216/38 | (2006.01) | |
| C08L 23/08 | (2006.01) | |

(52) U.S. Cl.
CPC ................ C08L 23/12 (2013.01); C08F 2/18 (2013.01); C08F 2/38 (2013.01); C08F 216/38 (2013.01); C08F 220/283 (2020.02); C08L 23/0815 (2013.01); C08L 2205/03 (2013.01)

(58) Field of Classification Search
CPC .......... C08L 23/04; C08L 23/10; C08L 23/12; C08L 23/14; C08L 23/142; C08L 23/16; C08K 5/07; C08K 5/103
See application file for complete search history.

(56) References Cited

U.S. PATENT DOCUMENTS

| | | |
|---|---|---|
| 8,729,186 B2 | 5/2014 | Berbee et al. |
| 8,822,601 B2 | 9/2014 | Karjala et al. |
| 9,228,036 B2 | 1/2016 | Berbee et al. |
| 9,234,055 B2 | 1/2016 | Berbee et al. |
| 9,334,348 B2 | 5/2016 | Berbee et al. |
| 9,394,389 B2 | 7/2016 | Berbee et al. |
| 9,809,701 B2 | 11/2017 | den Doelder et al. |
| 9,828,496 B2 | 11/2017 | den Doelder et al. |
| 10,273,318 B2 | 4/2019 | Hosman et al. |
| 10,435,489 B2 | 10/2019 | Berbee et al. |
| 10,494,456 B2 | 12/2019 | Berbee et al. |
| 10,494,457 B2 | 12/2019 | Berbee et al. |
| 10,501,561 B2 | 12/2019 | Berbee et al. |
| 11,078,353 B2 * | 8/2021 | Zhang .................... C08L 23/14 |
| 2016/0137822 A1 | 5/2016 | den Doelder et al. |
| 2016/0304638 A1 | 10/2016 | Den Doelder et al. |

FOREIGN PATENT DOCUMENTS

| | | |
|---|---|---|
| CN | 103589048 A | 2/2014 |
| CN | 104302718 A | 1/2015 |
| EP | 0497101 A2 | 8/1992 |
| EP | 1988122 A1 | 11/2008 |
| EP | 2108679 A1 | 10/2009 |
| WO | 2013/083285 A1 | 6/2013 |
| WO | 2016/166072 A1 | 10/2016 |
| WO | 2017/083563 A1 | 5/2017 |
| WO | 2017/146981 A1 | 8/2017 |
| WO | 2017/201110 A1 | 11/2017 |

OTHER PUBLICATIONS

PCT/CN2017/086488, International Search Report and Written Opinion with a dated Mar. 6, 2018.
PCT/US2018/034107, International Search Report and Written Opinion with a dated Oct. 31, 2018.

* cited by examiner

Primary Examiner — Mark S Kaucher

(57) ABSTRACT

The present disclosure provides a composition comprising: (A) a polypropylene polymer; (B) a polyolefin elastomer; (C) an acetoacetyl functional polymer; (D) an optional additive component; and (E) an optional compatibilizer. The present disclosure also provides an article made from the composition.

15 Claims, No Drawings

THERMOPLASTIC POLYOLEFIN COMPOSITIONS USEFUL FOR ALDEHYDE ABATEMENT

BACKGROUND

The present disclosure relates to thermoplastic polyolefin compositions useful for aldehyde abatement.

Automobile interior parts are typically made of thermoplastic polyolefin (TPO) compositions, such as TPO compositions containing polyolefin elastomer (POE). Increasing pressures and consumer concerns on car interior air quality have led to government regulations that limit the concentration of volatile organic compounds (VOCs), such as aldehydes, permissible in automobile interior parts. For example, certain government regulations have been recently implemented which limit the concentration of aldehydes in automobile interior parts to less than 0.10 mg/m$^3$ formaldehyde, less than 0.05 mg/m$^3$ acetaldehyde, and less than 0.05 mg/m$^3$ acrolein.

A need exists for a thermoplastic polyolefin composition useful for aldehyde abatement. A need also exists for an aldehyde abatement thermoplastic polyolefin composition that significantly reduces aldehydes, maintains the balance of mechanical properties important for automobile interior parts, such as sufficient toughness and stiffness, and is cost-effective.

SUMMARY OF THE INVENTION

In certain embodiments, the present disclosure provides a composition comprising:
 (A) a polypropylene polymer;
 (B) a polyolefin elastomer; and
 (C) an acetoacetyl functional polymer.

Optionally, in certain embodiments, the composition of the present disclosure may further comprise (D) an additive component and/or (E) a compatibilizer.

In certain embodiments, the present disclosure provides a composition comprising:
 (A) from 50 wt % to 85 wt % of a polypropylene polymer;
 (B) from 5 wt % to 35 wt % of a polyolefin elastomer;
 (C) from 0.1 wt % to 20 wt % of an acetoacetyl functional polymer;
 (D) from 0 wt % to 30 wt % of an additive component; and
 (E) from 0 wt % to 10 wt % of a compatibilizer.

In certain embodiments, the present disclosure provides an article made from a composition comprising:
 (A) a polypropylene polymer;
 (B) a polyolefin elastomer; and
 (C) an acetoacetyl functional polymer.

Optionally, in certain embodiments, an article made from the composition of the present disclosure may further comprise (D) an additive component and/or (E) a compatibilizer.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value, as well as decimal values. For ranges containing explicit values (e.g., 1 to 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

An "ethylene-based polymer," "ethylene polymer," or "polyethylene" is a polymer that contains equal to or greater than 50 wt %, or a majority amount of, polymerized ethylene monomer (based on the total weight of the polymer) and, optionally, may contain at least one comonomer. The generic term "polyethylene" thus includes polyethylene homopolymer and polyethylene interpolymer.

An "ethylene/α-olefin polymer" is a polymer that contains equal to or greater than 50 wt %, or a majority amount of, polymerized ethylene, based on the weight of the polymer, and one or more α-olefin comonomers.

A "homopolymer" is a polymer comprising repeating units derived from a single monomer type, but does not exclude residual amounts of other components used in preparing the homopolymer, such as chain transfer agents.

"Olefin polymer," "olefinic polymer," "olefinic interpolymer," "polyolefin" and like terms refer to a polymer derived from simple olefins. A "polyolefin" contains equal to or greater than 50 wt %, or a majority amount of, polymerized olefin monomer (based on the total weight of the polymer) and, optionally, may contain at least one comonomer. Non-limiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Representative polyolefins include polyethylene, polypropylene, polybutene, polyisoprene, and their various interpolymers.

A "polymer" is a compound prepared by polymerizing monomers, whether of the same or a different type, that in polymerized form provide the multiple and/or repeating "units" or "mer units" that make up a polymer. "Polymer" includes homopolymers, copolymers, terpolymers, interpolymers, and so on. "Polymer" also embraces all forms of copolymer, e.g., random, block, etc. An "interpolymer" is a polymer prepared by the polymerization of at least two types of monomers or comonomers. "Interpolymer" includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "polypropylene polymer," "propylene-based polymer," or "propylene polymer," is a polymer that contains equal to or greater than 50 wt %, or a majority amount of, polymerized propylene monomer (based on the total weight of the polymer) and, optionally, may contain at least one comonomer. The generic term "polypropylene" thus includes propylene homopolymer, propylene interpolymer, a blend of two or more propylene homopolymers, a blend of two or more propylene interpolymers, and a blend of one or more propylene homopolymers with one or more propylene interpolymers.

"Polystyrene" is an aromatic polymer prepared from styrene monomer as the only type of monomer. Thus, polystyrene is a styrene homopolymer. The generic term "polystyrene" includes impact modified polystyrene.

A "styrenic block copolymer" is an elastomer having at least one block segment of a styrenic monomer in combination with another block segment of another comonomer. The structure of the styrene block copolymers can be of the linear or radial type, and of the diblock or triblock type. Styrenic block copolymers are available from Dexco Polymers under the trademark VECTOR, from Kraton Corporation under the trademark KRATON, and from Dynasol under the trademark SOLPRENE.

A "thermoplastic" material is a linear or branched polymer which can be repeatedly softened and made flowable when heated and returned to a hard state when cooled to room temperature. In addition, thermoplastics can be molded or extruded into articles of any predetermined shape when heated to the softened state.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this disclosure, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Polymerized unit" as used herein, also known as "structural unit", of the named monomer refers to the remnant of the monomer after polymerization.

(A) Polypropylene Polymer

The present composition comprises a polypropylene polymer. In certain embodiments, the present composition comprises from 50 wt % to 85 wt % (e.g., from 50 wt % to 80 wt %, from 55 wt % to 75 wt %, from 60 wt % to 70 wt %, from 60 wt % to 65 wt %, from 61 wt % to 64 wt %, and/or from 62 wt % to 63 wt %) of a polypropylene polymer, based on the total weight of the composition. Said in another way, in certain embodiments, the composition comprises from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene polymer, based on the total weight of the composition.

In certain embodiments, the polypropylene polymer contains from greater than 50 wt %, or 60 wt %, or 70 wt %, or 75 wt % to 80 wt %, or 90 wt %, or 95 wt %, or 98 wt %, or 99 wt %, or 100 wt % polymerized propylene monomer, based on the total weight of the polymer. The remainder of the polypropylene polymer is derived from units of ethylene and/or an α-olefin having from 4, or 6 to 8, or 12, or 16, or 20 carbon atoms. In an embodiment, the α-olefin is a $C_4$-$C_{20}$ linear, branched, or cyclic α-olefin.

Nonlimiting examples of suitable polypropylene polymers include polypropylene homopolymer (such as Braskem™ Polypropylene H502-25RZ); polypropylene random copolymer (such as Braskem™ Polypropylene R751-12N); polypropylene impact copolymer (such as YUPLENE™ BX3900 available from SK Global Chemical and Braskem™ Polypropylene T702-12N); graft polypropylene copolymers; and block propylene copolymers (such as polypropylene olefin block copolymers (PP-OBC) available from The Dow Chemical Company).

In various embodiments, the polypropylene polymer is a polypropylene impact copolymer.

In various embodiments, the polypropylene polymer has a density from 0.890 to 0.920 g/cm$^3$ (e.g., from 0.890 to 0.915 g/cm$^3$, from 0.890 to 0.910 g/cm$^3$, from 0.895 to 0.905 g/cm$^3$, etc.) in accordance with ASTM D792. Said in another way, in various embodiments, the polypropylene polymer has a density from 0.890 g/cm$^3$, or 0.895 g/cm$^3$, or 0.900 g/cm$^3$ to 0.905 g/cm$^3$, or 0.910 g/cm$^3$, or 0.915 g/cm$^3$, or 0.920 g/cm$^3$ in accordance with ASTM D792.

In various embodiments, the polypropylene polymer has a melt flow rate from 30 g/10 min to 100 g/10 min (e.g., from 40 to 90 g/10 min, from 45 to 80 g/10 min, from 50 to 70 g/10 min, from 55 to 65 g/10 min, etc.) in accordance with ASTM D1238 (230° C./2.16 kg). Said in another way, in various embodiments, the polypropylene polymer has a melt flow rate from 30 g/10 min, or 40 g/10 min, or 50 g/10 min, or 55 g/10 min, or 60 g/10 min to 65 g/10 min, or 70 g/10 min, or 80 g/10 min, or 90 g/10 min, or 100 g/10 min (ASTM D1238, 230° C./2.16 kg).

Polypropylene suitable for use herein can have one, some, or all of the following properties:

(a) a density from 0.890 g/cm$^3$, or 0.895 g/cm$^3$, or 0.900 g/cm$^3$ to 0.905 g/cm$^3$, or 0.910 g/cm$^3$, or 0.915 g/cm$^3$, or 0.920 g/cm$^3$ in accordance with ASTM D792; and/or (b) a melt flow rate from 50 g/10 min, or 55 g/10 min, or 60 g/10 min to 65 g/10 min, or 70 g/10 min, or 80 g/10 min, or 90 g/10 min, or 100 g/10 min in accordance with ASTM D1238 (230° C./2.16 kg).

In one or more embodiments, the polypropylene polymer is a polypropylene impact copolymer with a density of 0.90 g/cm$^3$ (ASTM D792) and a melt flow rate of 60 g/10 min (ASTM D1238, 230° C./2.16 kg).

The polypropylene polymer may comprise one or more embodiments disclosed herein.

(B) Polyolefin Elastomer

The present composition comprises a polyolefin elastomer. In certain embodiments, the present composition comprises from 5 wt % to 35 wt % (e.g., from 10 wt % to 35 wt %, from 15 wt % to 30 wt %, from 15 wt % to 25 wt %, from 20 wt % to 25 wt %, from 20 wt % to 23 wt %, and/or from 20 wt % to 21 wt %) of a polyolefin elastomer, based on the total weight of the composition. Said in another way, in certain embodiments, the composition comprises from 5 wt %, or 10 wt %, or 15 wt %, or 20 wt % to 21 wt %, or 23 wt %, or 25 wt %, or 30 wt %, or 35 wt % of a polyolefin elastomer, based on the total weight of the composition.

In certain embodiments, the polyolefin elastomer of the present composition is a polyolefin elastomer or a mixture of polyolefin elastomers. A "polyolefin elastomer" is an elastomeric polymer containing at least 50 mole percent (mol %) of units derived from one or more α-olefins (based on the total amount of polymerizable monomers), or that contains equal to or greater than 50 wt %, or a majority amount of, polymerized α-olefin monomer (based on the total weight of the elastomer). In various embodiments, the polyolefin elastomers consist of only polymerized α-olefin monomer, including ethylene. Such polyolefin elastomers can be either homopolymers or interpolymers. Examples of polyolefin homopolymers are homopolymers of ethylene or propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In certain embodiments, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene (VLDPE) (e.g., FLEXOMER™ ethylene/1-hexene polyethylene made by The Dow Chemical Company); homogeneously branched, linear ethylene/α-olefin copolymers (e.g. TAFMER™ by Mitsui Petrochemicals Company Limited and EXACT™ by Exxon Chemical Company); homogeneously branched, substantially linear ethylene/α-olefin copolymers (e.g., AFFINITY™ and ENGAGE™ available from The Dow Chemical Company); amorphous polyolefins (APOs) (e.g., EASTOFLEX™ amorphous propylene homopolymer available from Eastman Chemical Company); olefin block copolymers (e.g., INFUSE™ and INTUNE™ olefin block copolymers available from The Dow Chemical Company); and combinations thereof. In various embodiments, the polyolefin elastomers are the homogeneously branched linear and substantially linear ethylene/α-olefin copolymers. The substantially linear ethylene copolymers are more fully described in U.S. Pat. Nos. 5,272,236; 5,278,272 and 5,986,028. In another embodiment, the polyolefin elastomers are amorphous polyolefins, such as those more fully described in US Pub. No. 2004/0081795.

The polyolefin elastomers useful herein also include propylene-, butene-, and other alkene-based copolymers. Such copolymers comprise a majority (i.e., greater than 50 weight percent (wt %)) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company. When the component (B) polyolefin elastomer includes a polypropylene, it is different than the component (A) polypropylene.

Polyolefin elastomers can also include ethylene/propylene/diene monomer (EPDM) terpolymer elastomers and chlorinated polyethylenes (CPE). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 wt %, or 60 wt % to 75 wt %, or 90 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 wt %, or 70 wt %, or 90 wt % to 97 wt %, or 98 wt %, or 99 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene. Nonlimiting examples of a suitable propylene-based polyolefin elastomer include propylene copolymer and propylene homopolymer. When the component (B) polyolefin elastomer includes a polypropylene, it is different than the component (A) polypropylene.

In one or more embodiments, the polyolefin elastomer includes an ethylene/octene copolymer.

Polyolefin elastomers suitable for use herein can have a density, in accordance with ASTM D792, from 0.850 g/cm$^3$ to 0.930 g/cm$^3$ (e.g., from 0.850 g/cm$^3$ to 0.920 g/cm$^3$, from 0.850 g/cm$^3$ to 0.910 g/cm$^3$, from 0.850 g/cm$^3$ to 0.900 g/cm$^3$, from 0.850 g/cm$^3$ to 0.890 g/cm$^3$, from 0.860 g/cm$^3$ to 0.880 g/cm$^3$, from 0.865 g/cm$^3$ to 0.875 g/cm$^3$, etc.). Said in another way, in various embodiments, a polyolefin elastomer suitable for use herein has a density from 0.850 g/cm$^3$, or 0.860 g/cm$^3$, or 0.865 g/cm$^3$ to 0.875 g/cm$^3$, or 0.880 g/cm$^3$, or 0.890 g/cm$^3$, or 0.900 g/cm$^3$, or 0.910 g/cm$^3$, or 0.920 g/cm$^3$, or 0.930 g/cm$^3$ in accordance with ASTM D792.

Polyolefin elastomers suitable for use herein can have a melt index from 0.1 g/10 min to 50 g/10 min (e.g., from 0.1 g/10 min to 40 g/10 min, from 0.1 g/10 min to 30 g/10 min, from 0.1 g/10 min to 20 g/10 min, from 0.1 g/10 min to 15 g/10 min, from 0.5 g/10 min to 10 g/10 min, from 0.5 g/10 min to 8 g/10 min, from 1 g/10 min to 8 g/10 min, from 2 g/10 min to 8 g/10 min, from 3 g/10 min to 7 g/10 min, from 4 g/10 min to 6 g/10 min, etc.) in accordance with ASTM D1238 (190° C./2.16 kg). Said in another way, in certain embodiments, polyolefin elastomers suitable for use herein can have a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

Polyolefin elastomers suitable for use herein can have one or both of the following properties:

(a) a density from 0.850 g/cm$^3$, or 0.860 g/cm$^3$, or 0.865 g/cm$^3$, or 0.870 g/cm$^3$ to 0.880 g/cm$^3$, or 0.890 g/cm$^3$, or 0.900 g/cm$^3$, or 0.905 g/cm$^3$, or 0.910 g/cm$^3$, or 0.920 g/cm$^3$, or less than 0.930 g/cm$^3$ in accordance with ASTM D792; and/or (b) a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

In one or more embodiments, the polyolefin elastomer includes an ethylene/octene copolymer with a density of 0.870 g/cm$^3$ (ASTM D792) and a melt index of 5 g/10 min (ASTM D1238, 190° C./2.16 kg).

The polyolefin elastomer may comprise one or more embodiments disclosed herein.

(C) Acetoacetyl Functional Polymer

The present composition comprises an acetoacetyl functional polymer. In certain embodiments, the present composition comprises from 0.1 wt % to 20 wt % (e.g., from 0.1 wt % to 15 wt %, from 0.1 wt % to 10 wt %, from 0.1 wt % to 5 wt %, from 0.1 wt % to 3 wt %, from 0.1 wt % to 2 wt %, from 0.1 wt % to 1 wt %, from 0.1 wt % to 0.75 wt %, from 0.1 wt % to 0.5 wt %, and/or from 0.1 wt % to 0.4 wt %) of an acetoacetyl functional polymer based on the total weight of the composition.

In certain embodiments, the acetoacetyl functional polymer is a polymer comprising an acetoacetyl functional group or acetoacetyl functional groups. In certain embodiments, the acetoacetyl functional polymer of the present disclosure is in the form of polymer beads or derived from polymer beads. In this regard, "derived from" means that, in certain embodiments, the acetoacetyl functional polymer of the present composition results from employing polymer beads comprising acetoacetyl functional group(s) during preparation of the present composition. For example, the acetoacetyl functional polymer of the present composition results from employing polymer beads comprising acetoacetyl functional group(s) during the extrusion or compounding process used to prepare the present composition.

In certain embodiments, the acetoacetyl functional polymer of the present disclosure is prepared by suspension polymerization. In certain embodiments, the acetoacetyl functional polymer of the present disclosure is prepared by suspension polymerization of a monomer composition comprising, based on the total weight of the monomer composition, from 21 wt % to 80 wt % (e.g., from 30 wt % to 80 wt %, from 35 wt % to 80 wt %, from 40 wt % to 75 wt %, from 45 wt % to 70 wt %, from 50 wt % to 70 wt %, etc.) of acetoacetyl functional monomers. The acetoacetyl functional polymer of the present disclosure is useful for reducing aldehydes and demonstrates higher formaldehyde abatement efficiency than incumbent polymers obtained by emulsion polymerization. In addition, the acetoacetyl functional polymer can be applied in solution or melt processes while having limited impacts on existing processing facilities.

In certain embodiments, the acetoacetyl functional polymer of the present disclosure is prepared by suspension polymerization and has certain advantages over the incumbent polymers obtained by emulsion polymerization. In certain embodiments, the acetoacetyl functional polymer prepared by suspension polymerization allows for a higher acetoacetyl functional group content compared to the incumbent polymers obtained by emulsion polymerization. In incumbent polymers obtained by emulsion polymerization, the acetoacetyl functional group content must remain low. Specifically, the content of acetoacetyl functional monomers used for preparing the acetoacetyl functional emulsion polymers usually cannot be higher than 10% by weight of the total monomers due to the following, unfavorable side reaction (i.e., hydrolysis reaction), which causes an unsafe buildup of pressure inside containers storing the polymers.

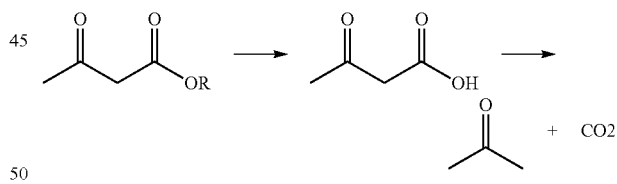

In contrast, in certain embodiments, the acetoacetyl functional polymer of the present disclosure prepared by suspension polymerization avoids the hydrolysis concern and allows for a higher acetoacetyl functional group content. Specifically, the content of acetoacetyl functional monomers (e.g., acetoacetoxyethyl methacrylate monomers) of the acetoacetyl functional polymer of the present disclosure can be as high as 80% by weight of the total monomers (e.g., 70% by weight of the total monomers).

Furthermore, in certain embodiments, the acetoacetyl functional polymer of the present disclosure prepared by suspension polymerization is synthesized without using any organic solvent, which addresses environmental, health, and safety concerns.

In certain embodiments, the present disclosure relates to a process for preparing an acetoacetyl functional polymer by suspension polymerizing a monomer composition in the presence of a chain transfer agent and a stabilizer, wherein the monomer composition comprises, based on the total weight of the monomer composition, from 21% to 80% by weight (e.g., from 30 wt % to 80 wt %, from 35 wt % to 80 wt %, from 40 wt % to 75 wt %, from 45 wt % to 70 wt %, from 50 wt % to 70 wt %, etc.) of an acetoacetyl functional monomer.

In certain embodiments, the present disclosure relates to an acetoacetyl functional polymer having an average particle size of from 10 to 2000 micrometers, wherein the acetoacetyl functional polymer has a number average molecular weight of from 2,000 to 300,000 and comprises, as polymerized units, from 21% to 80% by weight (e.g., from 30 wt % to 80 wt %, from 35 wt % to 80 wt %, from 40 wt % to 75 wt %, from 45 wt % to 70 wt %, from 50 wt % to 70 wt %, etc.) of an acetoacetyl functional monomer.

In certain embodiments, the present disclosure relates to a process for removing aldehydes from a polymer composition comprising aldehydes by adding to the polymer composition the acetoacetyl functional polymer of the present disclosure.

The monomer composition useful for preparing the acetoacetyl functional polymer may comprise one or more acetoacetyl functional monomers. The acetoacetyl functional monomers may have one or more acetoacetyl functional groups represented by:

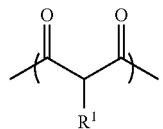

wherein $R^1$ is hydrogen, an alkyl having 1 to 10 carbon atoms, or phenyl.

Examples of acetoacetyl functional groups include

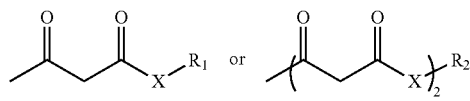

wherein X is O, $R_1$ is a divalent radical, and $R_2$ is a trivalent radical that may attach the acetoacetyl functional group to a polymer backbone.

The acetoacetyl functional monomer useful for preparing the acetoacetyl functional polymer can be an ethylenically unsaturated acetoacetyl functional monomer. Non-limiting examples of ethylenically unsaturated acetoacetyl functional monomers suitable for use herein include acetoacetoxyethyl methacrylate ("AAEM"), acetoacetoxyethyl acrylate, acetoacetoxypropyl methacrylate, allyl acetoacetate, acetoacetoxybutyl methacrylate, 2,3-di(acetoacetoxy)propyl methacrylate, or combinations thereof. The monomer composition may comprise, based on the total weight of the monomer composition, 21% by weight or more, 25% by weight or more, 30% by weight or more, 35% by weight or more, 40% by weight or more, 45% by weight or more, or even 50% by weight or more, and at the same time, 80% by weight or less, 75% by weight or less, or even 70% by weight or less of the acetoacetyl functional monomer.

The monomer composition useful for preparing the acetoacetyl functional polymer may further comprise one or more mono-ethylenically unsaturated nonionic monomers. As used herein, the term "nonionic monomers" refers to monomers that do not bear an ionic charge between pH=1-14. Suitable mono-ethylenically unsaturated nonionic monomers may include, for example, mono-ethylenically unsaturated nonionic acrylic monomers that are different from the acetoacetyl functional monomer defined above; styrene and substituted styrene such as .alpha.-methyl styrene, p-methyl styrene, t-butyl styrene, vinyltoluene, or mixtures thereof; α-olefins such as ethylene, propylene, and 1-decene; vinyl acetate, vinyl butyrate, vinyl versatate and other vinyl esters; or combinations thereof. Preferred mono-ethylenically unsaturated nonionic monomers are selected from $C_1$-$C_{18}$, $C_4$-$C_{12}$, or $C_8$-$C_{10}$ alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, (meth)acrylonitrile, (meth)acrylamide, or mixtures thereof. More preferred mono-ethylenically unsaturated nonionic monomers are methyl methacrylate, ethyl acrylate, butyl acrylate, 2-ethylhexyl acrylate, or a mixture thereof. The monomer composition may comprise, based on the total weight of the monomer composition, from 20 to 79% by weight of the mono-ethylenically unsaturated nonionic monomer, for example, 20% by weight or more, 25% by weight or more, or even 30% by weight or more, and at the same time, 79% by weight or less, 70% by weight or less, 65% by weight or less, 60% by weight or less, 55% by weight or less, or even 50% by weight or less. In certain embodiments, the monomer composition may comprise, based on the total weight of the monomer composition, from 20 wt % to 79 wt % (e.g., from 20 wt % to 70 wt %, from 20 wt % to 60 wt %, from 25 wt % to 55 wt %, from 25 wt % to 55 wt %, from 25 wt % to 50 wt %, from 30 wt % to 50 wt %, etc.) of the mono-ethylenically unsaturated nonionic monomer.

In certain embodiments, the monomer composition useful for preparing the acetoacetyl functional polymer comprises, based on the total weight of the monomer composition, from 50% to 70% by weight of the acetoacetyl functional monomer and from 30% to 50% by weight of the mono-ethylenically unsaturated nonionic monomer such as alkyl esters of (meth)acrylic acids. In another embodiment, the monomer composition useful for preparing the acetoacetyl functional polymer comprises, based on the total weight of the monomer composition, less than 40% by weight of styrene and substituted styrene, less than 30% by weight, less than 20% by weight, less than 10% by weight, or even less than 5% by weight. In certain embodiments, the monomer composition is substantially free of styrene and substituted styrene. "Substantially free of styrene and substituted styrene" means that the concentration of styrene and substituted styrene is zero in an embodiment and can be less than 0.1% by weight in another embodiment, less than 0.2% in still another embodiment or less than 0.5% by weight in yet another embodiment, based on the total weight of the monomer composition.

The monomer composition useful for preparing the acetoacetyl functional polymer may further comprise one or more ethylenically unsaturated ionic monomers carrying at least one functional group selected from a carboxyl, carboxylic anhydride, sulphonate, or phosphate group. "Ionic monomers" herein refer to monomers that bear an ionic charge between pH=1-14. Suitable ethylenically unsaturated ionic monomers carrying at least one functional group may include, for example, α, β-ethylenically unsaturated carboxylic acids or anhydrides thereof such as (meth)acrylic acid, itaconic acid (IA), fumaric acid, anhydride, (meth)acrylic anhydride, maleic anhydride, or mixtures thereof; sodium styrene sulfonate (SSS); sodium vinyl sulfonate (SVS); 2-acrylamido-2-methylpropanesulfonic acid (AMPS); or mixtures thereof. Preferred ethylenically unsaturated ionic monomers carrying at least one functional group include sodium styrene sulfonate, sodium vinyl sulfonate, 2-acrylamido-2-methylpropanesulfonic acid, acrylic acid (AA), methylacrylic acid (MAA), itaconic acid, or mixtures thereof. The monomer composition may comprise, based on the total weight of the monomer composition, from 0 to 50% by weight, from 10% to 40% by weight, or from 20% to 30% by weight of the ethylenically unsaturated ionic monomer carrying at least one functional group.

In certain embodiments, the monomer composition useful for preparing the acetoacetyl functional polymer is substantially free of one or more multiethylenically unsaturated monomers. "Substantially free of one or more multiethylenically unsaturated monomers" means that the concentration of the multiethylenically unsaturated monomers is zero in an embodiment and can be less than 1% by weight in another embodiment, less than 0.5% by weight in still another embodiment or even less than 0.1% by weight in yet another embodiment, based on the total weight of the monomer composition. Examples of suitable multiethylenically unsaturated monomers include butadiene, allyl(meth)acrylate, divinyl benzene, ethylene glycol dimethacrylate, butylene glycol dimethacrylate, or mixtures thereof.

In certain embodiments, the monomer composition for preparing the acetoacetyl functional polymer comprises the acetoacetyl functional monomer and the rest being an additional acrylic monomer that is different from the acetoacetyl functional monomer. The amount of the acetoacetyl functional monomer used is as described above. The additional acrylic monomer may comprise those acrylic monomers described above with regard to the mono-ethylenically unsaturated nonionic acrylic monomers, such as the alkyl esters of (meth)acrylic acids, (meth)acrylonitrile, and (meth)acrylamide; acrylic monomers described above with regard to the ethylenically unsaturated ionic monomers carrying at least one functional group, such as (meth)acrylic acid; acrylic monomers described above with regard to the multiethylenically unsaturated monomers; and mixtures thereof.

In another embodiment, the acetoacetyl functional polymer is prepared by suspension polymerization of a monomer composition comprising, based on the total weight of the monomer composition, from 50% to 70% by weight of the acetoacetyl functional monomer, such as AAEM, and from 30% to 50% by weight of the additional acrylic monomer that is different from the acetoacetyl functional monomer.

In certain embodiments, the acetoacetyl functional polymer is prepared by suspension polymerization of a monomer composition comprising, based on the total weight of the monomer composition, from 50% to 70% by weight of the acetoacetyl functional monomer, such as AAEM, from 30% to 50% by weight of alkyl esters of (meth)acrylic acids, such as methyl methacrylate, ethyl acrylate, butyl acrylate, 2-ethylhexyl acrylate, or mixtures thereof; and from 0 to 20% by weight of α, β-ethylenically unsaturated carboxylic acids or anhydrides, such as acrylic acid, methacrylic acid, itaconic acid (IA), fumaric acid, or mixtures thereof.

The acetoacetyl functional polymer of the present disclosure may be prepared by suspension polymerization of the monomer composition described above. Total weight concentration of monomers for preparing the acetoacetyl functional polymer is equal to 100%. A mixture of monomers (i.e., the monomer composition) may be added neat or as an oil phase including a free radical initiator; or added in one or more additions or continuously, linearly or nonlinearly, over the reaction period of preparing the acetoacetyl functional polymer. The monomer composition may be first mixed with a free radical initiator and a chain transfer agent to form an oil phase, and then the oil phase may be added into a water phase. The water phase may comprise a stabilizer and, optionally, an inorganic salt such as sodium chloride, potassium chloride, and sodium sulphate; an inhibitor such as 4-hydroxy-2,2,6,6-tetramethylpiperidin-1-oxyl ("4-Hydroxy-TEMPO"); or mixtures thereof. The monomers can be suspended as droplets often of diameter from 1 μm to 1,000 μm in water. The suspension polymerization may be conducted under nitrogen ($N_2$) atmosphere. The suspension polymerization is typically conducted under agitation at a speed of from 5 to 1000 revolutions per minute (rpm), from 20 to 600 rpm, or from 50 to 300 rpm. Temperature suitable for suspension polymerization may be in the range of from 20° C. to 99° C., or in the range of from 60° C. to 90° C. Time duration for suspension polymerization may be in the range of from 1 to 30 hours, or in the range of from 3 to 9 hours. The resultant acetoacetyl functional polymer may be isolated by filtration and optionally washed with one or more solvents. Suitable solvents for washing the acetoacetyl functional polymer may include tetrahydrofuran, methanol, acetone, water, or mixtures thereof. Preferred solvent is a mixture of methanol and water. The resultant acetoacetyl functional polymer may be further dried, for example, under vacuum.

In the suspension polymerization of the monomer composition, free radical initiators may be used to initiate the polymerization. Examples of suitable free radical initiators include benzoyl peroxide, lauroyl peroxide, dioctanoyl peroxide, 2,2'-azobisisobutyronitrile and 2,2'-azobis(2,4-dimethylvaleronitrile), or mixtures thereof. The free radical initiators may be used typically at a level of from 0.01% to 5% by weight or from 0.1% to 2% by weight, based on the total weight of the monomer composition.

Suspension polymerization of the monomer composition for preparing the acetoacetyl functional polymer may be conducted in the presence of one or more stabilizers. The stabilizers are compounds useful for preventing agglomeration of monomer droplets. Examples of suitable stabilizers include polyvinyl alcohol (PVA), polyacrylic acid, polyvinyl pyrrolidone, polyalkylene oxide, barium sulphate, magnesium sulphate, sodium sulphate, gelatin, poly(diallyldimethylammonium chloride) (PDMAC), hydroxypropyl methylcellulose (HPMC), or mixtures thereof. Preferred stabilizers are polyvinyl alcohol, gelatin, poly(diallyldimethylammonium chloride), or mixtures thereof. In certain embodiments, the stabilizers are added in at least two additions. A first portion of the stabilizers may be added prior to polymerization, e.g., by mixing with the monomer composition; and a second portion of the stabilizers may be added during polymerization, for example, from 10 to 100 minutes or from 20 to 60 minutes after the beginning of the suspension polymerization (e.g., when reaction temperature reaches 60° C.). In a preferred embodiment, the second portion of the stabilizers comprises gelatin.

The stabilizer may be used in an amount of from 0.01% to 3% by weight or from 0.1% to 2% by weight, based on the total weight of the monomer composition. When the stabilizer is added in at least two additions, the first addition may be from 10% to 90% by weight and the second addition, preferably comprising gelatin, may be from 10% to 90% by weight, based on the total weight of the stabilizer.

Suspension polymerization of the monomer composition for preparing the acetoacetyl functional polymer may be conducted in the presence of one or more chain transfer agents. The chain transfer agents may include thiols, halocarbons such as carbon tetrachloride, or mixtures thereof. Examples of suitable chain transfer agents include 3-mercaptopropionic acid, n-dodecyl mercaptan (nDDM), methyl 3-mercaptopropionate, butyl 3-mercaptopropionate, benzenethiol, azelaic alkyl mercaptan, or mixtures thereof. The chain transfer agent may be used in an effective amount to control the molecular weight of the acetoacetyl functional polymer. For example, the chain transfer agent may be present in an amount of from 0.01% to 5% by weight, from 0.2% to 3% by weight, or from 0.4% to 2% by weight, based on the total weight of the monomer composition used for preparing the acetoacetyl functional polymer.

The resultant acetoacetyl functional polymer of the present disclosure is usually present in the form of beads. The acetoacetyl functional polymer may have an average particle size of from 10 to 2000 micrometers ($\mu$m), from 50 to 1500 $\mu$m, from 100 to 1000 $\mu$m, or from 200 to 700 $\mu$m. The particle size herein refers to population based average particle size as measured by Beckman Coulter RapidVue optical microscope.

The acetoacetyl functional polymer obtained from suspension polymerization may comprise as polymerized units, based on the weight of the acetoacetyl functional polymer, from 21% to 80% by weight (e.g., from 30 wt % to 80 wt %, from 35 wt % to 80 wt %, from 40 wt % to 75 wt %, from 45 wt % to 70 wt %, from 50 wt % to 70 wt %, etc.) of the acetoacetyl functional monomer and from 20 to 79% by weight (e.g., from 20 wt % to 70 wt %, from 20 wt % to 60 wt %, from 25 wt % to 55 wt %, from 25 wt % to 55 wt %, from 25 wt % to 50 wt %, from 30 wt % to 50 wt %, etc.) of other monomers including, for example, the mono-ethylenically unsaturated nonionic monomers and/or the ethylenically unsaturated ionic monomer carrying at least one functional groups described above used in suspension polymerization. The weight content of each monomer based on the total weight of the monomer composition may be substantially the same as the weight content of such monomer as polymerized units of the acetoacetyl functional polymer based on the weight of the acetoacetyl functional polymer.

The acetoacetyl functional polymer of the present disclosure may have a number average molecular weight of from 2,000 to 300,000, from 3,000 to 100,000, from 5,000 to 50,000, or from 7,000 to 20,000, as measured by Gel Permeation Chromatography (GPC) with Polystyrene Narrow standards having molecular weights ranging from 2329000 to 580 g/mol.

The acetoacetyl functional polymer of the present disclosure may have a glass transition temperature (Tg) of from 20° C. to 95° C., from 30° C. to 80° C., from 40° C. to 70° C., or from 50° C. to 60° C. Tg is measured according to the method described in the Examples section below.

The acetoacetyl functional polymer of the present composition can cause aldehyde abatement (i.e., reduction). Examples of aldehydes include formaldehyde, acetaldehyde, acrolein, propionaldehyde, and crotonaldehyde. The reaction of the acetoacetyl functional polymer with aldehyde is irreversible as compared to those conventional physical absorbers such as micro porous aluminosilicate and zeolite powder. The acetoacetyl functional polymer can provide high aldehyde abatement efficiency, for example, formaldehyde abating efficiency in the range of from 75 milligrams formaldehyde per gram of the acetoacetyl functional polymer (mg/g) to 130 mg/g, or from 80 mg/g to 110 mg/g, as determined by a headspace GC-Mass method. Not wishing to be bound by any particular theory, it is believed that the methylene group(s) within the acetoacetyl functional group (s) present in the acetoacetyl functional polymer reacts with aldehydes present in air or in a composition, such as by a nucleophilic addition reaction, which reduces the aldehyde concentration.

The acetoacetyl functional polymer of the present disclosure can be processed into different forms. In certain embodiments, the acetoacetyl functional polymer can be dissolved in a solvent to form a solution. Such solution can be coated to a substrate to form a continuous film. Examples of suitable solvents include ethyl acetate, tetrahydrofuran, acetone, or mixtures thereof. The acetoacetyl functional polymer can form a solution at a concentration of 10% to 90% or from 15% to 70% when dissolved in ethyl acetate at room temperature for 12 hours with or without agitation. The solubility of the acetoacetyl functional polymer in a solvent enables it miscible with other solvent systems, thus the acetoacetyl functional polymer can be used in solvent-borne applications such as adhesives without compatibility concerns. In another embodiment, the acetoacetyl functional polymer of the present disclosure, usually in the form of beads, is a thermoplastic material that can be annealed, thus melted to form a continuous film upon heating. The acetoacetyl functional polymer is useful in various applications including, for example, coatings, automotives, elastomers, and adhesives.

The present disclosure also relates to a process for removing aldehydes from a polymer composition comprising aldehydes by adding the acetoacetyl functional polymer into the polymer composition. The polymer composition may further comprise an additional polymer including, for example, a polyolefin such as polyethylene and polypropylene, a thermoplastic olefin such as a thermoplastic olefin comprising polyolefin elastomers, an epoxy resin, a different acrylic polymer, a polyurethane, or mixtures thereof. The acetoacetyl functional polymer may be added in the form of beads or a solution. The polymer composition can be processed by conventional compounding processes, e.g., extrusion, injection, and compression molding.

(D) Additive Component

In certain embodiments, the present composition may comprise an additive component, which includes one or more optional additives. In certain embodiments, the present composition comprises from 0 wt % to 30 wt % (e.g., from 5 wt % to 25 wt %, from 10 wt % to 20 wt %, from 12 wt % to 18 wt %, from 15 wt % to 18 wt %, and/or from 16 wt % to 17 wt %) of an additive component, based on the total weight of the composition. Said in another way, in certain embodiments, the present composition comprises from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive component, based on the total weight of the composition.

Conventional additives, which can be introduced into the composition, are exemplified by talc, antioxidants, mineral oil, pigments, processing aids, flame retardants, ultraviolet (UV) stabilizers, reinforcing filler, calcium carbonate, mica, glass fibers, whisker, anti-scratch additives, and combinations thereof.

In an embodiment, the composition includes talc, such as JetFil™ 700, available from IMERYS. Talc is typically used in amounts of from 0 wt %, or 1 wt %, or 5 wt %, or 10 wt %, or 15 wt %, or 16 wt % to 17 wt %, 18 wt %, or 20 wt %, or 25 wt %, or 30 wt %, based on the total weight of the composition.

Nonlimiting examples of suitable antioxidant includes tris(2,4-ditert-butylphenyl)phosphite, pentaerythritol tetrakis[3-[3,5-di-tert-butyl-4-hydroxyphenyl]propionate], and combinations thereof. In an embodiment, the composition contains an antioxidant such as IRGANOX™ B 225, which contains a blend of 50 wt % tris(2,4-ditert-butylphenyl) phosphite and 50 wt % pentaerythritol tetrakis[3-[3,5-di-tert-butyl-4-hydroxyphenyl]propionate]. Antioxidant is typically used in amounts of from 0 wt %, or 0.05 wt %, or 0.1 wt %, or 0.2 wt % to 0.3 wt %, or 0.5 wt %, or 1 wt %, or 2 wt %, based on the total weight of the composition.

In an embodiment, the composition includes a processing aid. Nonlimiting examples of suitable processing aids include calcium stearate. Processing aids are typically used in amounts of from 0 wt %, or 0.05 wt %, or 0.1 wt % to 0.5 wt %, or 1 wt %, or 2 wt %, based on the total weight of the composition.

In an embodiment, the composition includes an ultraviolet (UV) stabilizer. Nonlimiting examples of suitable ultraviolet (UV) stabilizer include hindered amine light stabilizer (HALS) such as bis(2,2,6,6,-tetramethyl-4-piperidyl)sebaceate (commercially available as Tinuvin™ 770 from BASF) and poly[[6-[(1,1,3,3-tetramethylbutyl)amino]-1,3,5-triazine-2,4-diyl][(2,2,6,6-tetramethyl-4-piperidinyl) imino]-1,6-hexanediyl[(2,2,6,6-tetramethyl-4-piperidinyl) imino]] (commercially available as Chimassorb™ 944 from BASF). UV stabilizers are typically used in amounts of from 0.05 wt %, or 0.1 wt %, or 0.5 wt % to 1 wt %, or 2 wt %, based on the total weight of the composition.

In an embodiment, the composition includes a reinforcing filler. Nonlimiting examples of reinforcing filler include glass fiber, mica, whisker, calcium carbonate ($CaCO_3$), and combinations thereof. Reinforcing filler is typically used in amounts of from 2 wt %, or 5 wt % to 10 wt %, or 15 wt %, or 20 wt %, based on the total weight of the composition.

In an embodiment, the composition includes talc and an antioxidant.

In an embodiment, the composition includes from 0 wt %, or greater than 0 wt %, or 1 wt %, or 5 wt %, or 10 wt %, or 15 wt %, or 16 wt % to 17 wt %, or 20 wt %, or 25 wt %, or 30 wt % total additives, based on the total weight of the composition.

The additive may comprise one or more embodiments disclosed herein.

(E) Compatibilizer

In certain embodiments, the present composition may optionally include a compatibilizer. In certain embodiments, the present composition comprises from 0 wt % to 10 wt % of a compatibilizer, based on the total weight of the composition. In certain embodiments, the present composition comprises from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 3.0 wt %, or 4.0 wt %, or 5.0 wt %, or 8.0 wt %, or 10 wt % of the compatibilizer, based on the total weight of the composition.

In certain embodiments, the compatibilizer improves the compatibility between the (B) polyolefin elastomer and the (C) acetoacetyl functional polymer.

The compatibilizer may be a styrenic block copolymer, an ethylene acrylic acid (EAA) copolymer, an ethylene ethyl acrylate (EEA) copolymer, a block composite, a specified block composite, a crystalline block composite, or combinations thereof.

In various embodiments, the compatibilizer is a styrenic block copolymer. The styrenic block copolymer may be any styrenic block copolymer disclosed herein. In an embodiment, the styrenic block copolymer is SEBS.

Styrenic block copolymer suitable for use herein can have, in accordance with D792, a density from 0.850 $g/cm^3$, or 0.860 $g/cm^3$, or 0.870 $g/cm^3$, or 0.880 $g/cm^3$ to 0.885 $g/cm^3$, or 0.890 $g/cm^3$, or 0.900 $g/cm^3$.

Styrenic block copolymer suitable for use herein can have, in accordance with D1238 (230° C./5.00 kg), a melt flow rate from 5 g/10 min, or 10 g/10 min, or 15 g/10 min, or 20 g/10 min to 25 g/10 min, or 30 g/10 min, or 40 g/10 min, or 50 g/10 min.

Styrenic block copolymer suitable for use herein can have one or both of the following properties:

(a) a density from 0.850 $g/cm^3$, or 0.860 $g/cm^3$, or 0.870 $g/cm^3$, or 0.880 $g/cm^3$ to 0.885 $g/cm^3$, or 0.890 $g/cm^3$, or 0.900 $g/cm^3$; and/or (b) a melt flow rate from 5 g/10 min, or 10 g/10 min, or 15 g/10 min, or 20 g/10 min to 25 g/10 min, or 30 g/10 min, or 40 g/10 min, or 50 g/10 min (230° C./5.00 kg).

In one or more embodiments, the compatibilizer is a styrenic block copolymer that is SEBS having a density of 0.880 $g/cm^3$ and a melt flow rate of 22 g/10 min (230° C./5.00 kg).

In various embodiments, the compatibilizer is an ethylene acrylic acid (EAA) copolymer. The EEA copolymer may contain from 1 wt %, or 5 wt %, or 10 wt %, or 12 wt %, or 15 wt %, or 18 wt % to 19 wt %, or 20 wt %, or 25 wt %, or 30 wt %, or 40 wt %, or less than 50 wt % polymerized ethyl acrylate, based on the total weight of the EEA copolymer. EEA copolymer suitable for use herein can have, in accordance with ASTM D792, a density from 0.920 $g/cm^3$, or 0.925 $g/cm^3$, or 0.930 $g/cm^3$ to 0.935 $g/cm^3$, or 0.940 $g/cm^3$, or 0.945 $g/cm^3$. EEA copolymer suitable for use herein can have, in accordance with ASTM D1238 (190° C./2.16 kg), a melt index from 0.5 g/10 min, or 1 g/10 min, or 2 g/10 min, or 5 g/10 min to 6 g/10 min, or 8 g/10 min, or 10 g/10 min, or 15 g/10 min, or 20 g/10 min.

In one or more embodiments, the compatibilizer is an EEA copolymer containing 18.5 wt % polymerized ethyl acrylate, based on the total weight of the EEA copolymer, that has a density of 0.931 $g/cm^3$ (ASTM D792) and a melt index of 6.0 g/10 min (ASTM D1238, 190° C./2.16 kg).

In an embodiment, the compatibilizer is a block composite. "Block composite" refers to polymers comprising an ethylene based polymer (EP) (soft copolymer) having an ethylene content of from 10 mol % to 90 mol %, an alpha-olefin based polymer (AOP) (hard copolymer) having an alpha-olefin content of greater than 90 mol %, and a block copolymer (diblock) having an ethylene block/segment (EB) and an alpha-olefin block/segment (AOB), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer. The block composite of the present disclosure is similar to those disclosed in U.S. Pat. Nos. 8,053,529; 8,686,087; and 8,716,400, which are incorporated herein by reference.

In an embodiment, the compatibilizer is a specified block composite. "Specified block composite" refers to polymers comprising an ethylene based polymer (EP) (soft copolymer) having an ethylene content of from 78 mol % to 90 mol %, an alpha-olefin based polymer (AOP) (hard copolymer) having an alpha-olefin content of from 61 mol % to 90 mol %, and a block copolymer (diblock) having an ethylene block/segment (EB) and an alpha-olefin block/segment (AOB), wherein the ethylene block of the block copolymer is the same composition as the ethylene based polymer of the specified block composite and the alpha-olefin block of the block copolymer is the same composition as the alpha-olefin based polymer of the specified block composite. The compositional split between the amount of ethylene based polymer and alpha-olefin based polymer will be essentially the same as that between the corresponding blocks in the block copolymer. The specified block composite of the present disclosure is similar to those disclosed in WO 2017/044547, which is incorporated herein by reference.

In an embodiment, the compatibilizer is a crystalline block composite. "Crystalline block composite" refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer (diblock) having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. The crystalline block composite of the present disclosure is similar to those disclosed in WO 2016/0028961 A1, which is incorporated herein by reference.

The compatibilizer may comprise one or more embodiments disclosed herein.

Composition

The present disclosure provides a composition, and further a thermoplastic polyolefin (POE) composition, comprising:
(A) a polypropylene polymer;
(B) a polyolefin elastomer;
(C) an acetoacetyl functional polymer;
(D) an optional additive component; and
(E) an optional compatibilizer.

In various embodiments, the composition includes:
(A) from 50 wt % to 85 wt % of a polypropylene polymer;
(B) from 5 wt % to 35 wt % a polyolefin elastomer;
(C) from 0.1 wt % to 20 wt % of an acetoacetyl functional polymer;
(D) from 0 wt % to 30 wt % of an additive component; and
(E) from 0 wt % to 10 wt % of a compatibilizer.

In various embodiments, the composition includes:
(A) from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene impact copolymer;
(B) from 5 wt %, or 10 wt %, or 15 wt %, or 20 wt % to 21 wt %, or 23 wt %, or 25 wt %, or 30 wt %, or 35 wt % of an ethylene/octene copolymer;
(C) from 0.1 wt % to 0.4 wt %, or 0.5 wt %, or 0.75 wt %, or 1 wt %, or 2 wt %, or 3 wt %, or 5 wt %, or 10 wt %, or 15 wt %, or 20 wt % of an acetoacetyl functional polymer;
(D) from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive selected from talc, antioxidant, processing aid, reinforcing filler, and combinations thereof; and
(E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 2.5 wt %, or 3.0 wt %, or 3.5 wt %, or 4.0 wt %, or 5.0 wt %, or 8.0 wt %, or 10 wt % of a compatibilizer selected from SEBS, EEA copolymer, EAA copolymer, or combinations thereof.

It is understood that the sum of the components in each of the foregoing compositions yields 100 weight percent.

In certain embodiments, the present composition includes at least four different components: (A) a polypropylene polymer, (B) a polyolefin elastomer, (C) an acetoacetyl functional polymer, and (D) an additive component. Thus, one component cannot serve as two components. For example, when each of the (A) polypropylene and (B) polyolefin elastomer are polypropylene, they are different polypropylenes (e.g., a polypropylene impact copolymer and a polypropylene homopolymer).

The present composition advantageously causes aldehyde abatement (i.e., reduction). Aldehydes can be dangerous to the health of humans and/or animals. Aldehydes can also be harmful to the environment. Nonlimiting examples of aldehydes include formaldehyde, acetaldehyde, acrolein, propionaldehyde, and crotonaldehyde.

In various embodiments, the present composition contains less than 0.01 mg/m$^3$ formaldehyde, as measured in accordance with the VOC Test Method described below in the Test Methods section. In certain embodiments, the present composition comprises from 0 mg/m$^3$ to less than 0.01 mg/m$^3$, or less than 0.02 mg/m$^3$, or less than 0.03 mg/m$^3$, or less than 0.05 mg/m$^3$ formaldehyde, as measured in accordance with the VOC Test Method.

In various embodiments, the present composition contains equal to or less than 0.05 mg/m$^3$ formaldehyde, as measured in accordance with the formaldehyde abatement test described below in the Test Methods section. In various embodiments, the present composition contains equal to or less than 0.05 mg/m$^3$, or equal to or less than 0.04 mg/m$^3$, or equal to or less than 0.03 mg/m$^3$, or equal to or less than 0.02 mg/m$^3$ formaldehyde, as measured in accordance with the formaldehyde abatement test.

In various embodiments, the present composition contains less than 0.430 mg/m$^3$ acetaldehyde, as measured in accordance with the VOC Test Method described below in the Test Methods section. In certain embodiments, the present composition contains equal to or less than 0.430 mg/m$^3$, or equal to or less than 0.420 mg/m$^3$, or equal to or less than 0.400 mg/m$^3$, or equal to or less than 0.380 mg/m$^3$, or equal to or less than 0.350 mg/m$^3$, or equal to or less than 0.330 mg/m$^3$, or equal to or less than 0.300 mg/m$^3$, or equal to or less than 0.290 mg/m$^3$, or equal to or less than 0.280 mg/m$^3$, or equal to or less than 0.270 mg/m$^3$, or equal to or less than 0.260 mg/m$^3$, or equal to or less than 0.250 mg/m$^3$, or equal to or less than 0.240 mg/m$^3$, or equal to or less than 0.230 mg/m$^3$ acetaldehyde, as measured in accordance with the VOC Test Method.

In various embodiments, the present composition contains less than 0.01 mg/m$^3$ acrolein, as measured in accordance with the VOC Test Method described below in the Test Methods section. In certain embodiments, the present composition comprises from 0 mg/m$^3$ to less than 0.01 mg/m$^3$, or less than 0.02 mg/m$^3$, or less than 0.03 mg/m$^3$, or less than 0.05 mg/m$^3$ acrolein, as measured in accordance with the VOC Test Method.

In various embodiments, the present composition has a flexural modulus (Young's modulus) from 1200 MPa, or 1400 MPa, or 1500 MPa to 1600 MPa, or 1700 MPa, or 1800 MPa, or 2000 MPa, as measured in accordance with ISO 178. In various embodiments, the present composition has a flexural modulus (Young's modulus) of greater than 1490 MPa, as measured in accordance with ISO 178.

In various embodiments, the present composition has a flexural yield strength from 20 MPa, or 25 MPa, or 29 MPa to 31 MPa, or 35 MPa, or 40 MPa, as measured in accordance with ISO 178. In various embodiments, the present composition has a flexural yield strength of greater than 29 MPa, as measured in accordance with ISO 178.

In various embodiments, the present composition has a tensile modulus from 1000 MPa, or 1250 MPa, or 1300 MPa, or 1400 Mpa, or 1450 MPa to 1600 MPa, or 1700 MPa, or 1800 MPa, or 2000 MPa, as measured in accordance with ISO 527. In various embodiments, the present composition has a tensile modulus of greater than 1450 MPa.

In various embodiments, the present composition has a tensile yield strength from 18 MPa, or 19 MPa to 21 MPa, or 25 MPa, or 30 MPa, as measured in accordance with ISO 527. In various embodiments, the present composition has a tensile yield strength of greater than 19 MPa.

In various embodiments, the present composition has an impact strength (Notched IZOD) at 23° C. from 15 kJ/m$^2$, or 20 kJ/m$^2$, or 30 kJ/m$^2$, or 33 kJ/m$^2$ to 36 kJ/m$^2$, or 40 kJ/m$^2$, or 45 kJ/m$^2$, or 50 kJ/m$^2$, as measured with ISO 180. In various embodiments, the present composition has an impact strength (Notched IZOD) at 23° C. of greater than 33 kJ/m$^2$.

In various embodiments, the present composition has an impact strength (Notched IZOD) at −30° C. from 2 kJ/m$^2$, or 3.5 kJ/m$^2$, or 4.0 kJ/m$^2$ to 5.0 kJ/m$^2$, or 6.0 kJ/m$^2$, or 8.0 kJ/m$^2$, as measured in accordance with ISO 180. In various embodiments, the present composition has an impact strength (Notched IZOD) at −30° C. of greater than 4.50 kJ/m$^2$.

In various embodiments, the composition contains less than 0.01 mg/m$^3$ formaldehyde, less than 0.430 mg/m$^3$ acetaldehyde, and/or less than 0.01 mg/m$^3$ acrolein, as measured in accordance with the VOC Test Method, and equal to or less than 0.05 mg/m$^3$ formaldehyde, as measured in accordance with the formaldehyde abatement test. In one or more embodiments, the present composition can have one, some, or all of the following properties:

(i) a flexural modulus (Young's modulus) from 1200 MPa, or 1400 MPa, or 1500 MPa to 1600 MPa, or 1700 MPa, or 1800 MPa, or 2000 MPa, as measured in accordance with ISO 178;

(ii) a flexural yield strength from 20 MPa, or 25 MPa, or 29 MPa to 31 MPa, or 35 MPa, or 40 MPa, as measured in accordance with ISO 178;

(iii) a tensile modulus from 1000 MPa, or 1250 MPa, or 1300 MPa, or 1400 Mpa, or 1450 MPa to 1600 MPa, or 1700 MPa, or 1800 MPa, or 2000 MPa, as measured in accordance with ISO 527;

(iv) a tensile yield strength from 18 MPa, or 19 MPa to 21 MPa, or 25 MPa, or 30 MPa, as measured in accordance with ISO 527;

(v) an impact strength (Notched IZOD) at 23° C. from 15 kJ/m$^2$, or 20 kJ/m$^2$, or 30 kJ/m$^2$, or 33 kJ/m$^2$ to 36 kJ/m$^2$, or 40 kJ/m$^2$, or 45 kJ/m$^2$, or 50 kJ/m$^2$, as measured in accordance with ISO 180;

and/or (vi) an impact strength (Notched IZOD) at −30° C. from 2 kJ/m$^2$, or 3.5 kJ/m$^2$, or 4.0 kJ/m$^2$ to 5.0 kJ/m$^2$, or 6.0 kJ/m$^2$, or 8.0 kJ/m$^2$, as measured in accordance with ISO 180.

In various embodiments, the composition has at least two, or at least three, or at least four, or at least five, or all of properties (i)-(vi).

In various embodiments, the composition includes:

(A) from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene impact copolymer;

(B) from 5 wt %, or 10 wt %, or 15 wt %, or 20 wt % to 21 wt %, or 23 wt %, or 25 wt %, or 30 wt %, or 35 wt % of an ethylene/octene copolymer;

(C) from 0.1 wt % to 0.4 wt %, or 0.5 wt %, or 0.75 wt %, or 1 wt %, or 2 wt %, or 3 wt %, or 5 wt %, or 10 wt %, or 15 wt %, or 20 wt % of an acetoacetyl functional polymer;

(D) from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive selected from talc, antioxidant, processing aid, reinforcing filler, and combinations thereof; and (E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 2.5 wt %, or 3.0 wt %, or 3.5 wt %, or 4.0 wt %, or 5.0 wt %, or 8.0 wt %, or 10 wt % of a compatibilizer selected from SEBS, EEA copolymer, EAA copolymer, or combinations thereof; and in one or more embodiments, the composition contains less than 0.01 mg/m$^3$ formaldehyde, less than 0.430 mg/m$^3$ acetaldehyde, and/or less than 0.01 mg/m$^3$ acrolein, as measured in accordance with the VOC Test Method, and equal to or less than 0.05 mg/m$^3$ formaldehyde, as measured in accordance with the formaldehyde abatement test; and in one or more embodiments, the present composition can have one, some, or all of the following properties:

(i) a flexural modulus (Young's modulus) from 1200 MPa, or 1400 MPa, or 1500 MPa to 1600 MPa, or 1700 MPa, or 1800 MPa, or 2000 MPa, as measured in accordance with ISO 178;

(ii) a flexural yield strength from 20 MPa, or 25 MPa, or 29 MPa to 31 MPa, or 35 MPa, or 40 MPa, as measured in accordance with ISO 178;

(iii) a tensile modulus from 1000 MPa, or 1250 MPa, or 1300 MPa, or 1400 Mpa, or 1450 MPa to 1600 MPa, or 1700 MPa, or 1800 MPa, or 2000 MPa, as measured in accordance with ISO 527;

(iv) a tensile yield strength from 18 MPa, or 19 MPa to 21 MPa, or 25 MPa, or 30 MPa, as measured in accordance with ISO 527;

(v) an impact strength (Notched IZOD) at 23° C. from 15 kJ/m$^2$, or 20 kJ/m$^2$, or 30 kJ/m$^2$, or 33 kJ/m$^2$ to 36 kJ/m$^2$, or 40 kJ/m$^2$, or 45 kJ/m$^2$, or 50 kJ/m$^2$, as measured in accordance with ISO 180;

and/or (vi) an impact strength (Notched IZOD) at −30° C. from 2 kJ/m$^2$, or 3.5 kJ/m$^2$, or 4.0 kJ/m$^2$ to 5.0 kJ/m$^2$, or 6.0 kJ/m$^2$, or 8.0 kJ/m$^2$, as measured in accordance with ISO 180.

In various embodiments, the composition has at least two, or at least three, or at least four, or at least five, or all of properties (i)-(vi).

In an embodiment, the composition is non-aqueous. A "non-aqueous" composition excludes a solvent, such as water.

In an embodiment, the composition excludes divalent metal ions such as zinc, calcium, magnesium, and zirconium.

In various embodiments, the composition is in the form of a pellet. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm.

The present composition may comprise one or more embodiments disclosed herein.

Article

The present disclosure provides an article made from a composition comprising:

(A) a polypropylene polymer;
(B) a polyolefin elastomer;
(C) an acetoacetyl functional polymer;
(D) an optional additive component; and
(E) an optional compatibilizer.

The composition may be any composition previously disclosed herein.

In various embodiments, the article is a molded article. The article may be formed by injection molding or compression molding.

The article may be in the form of an automobile interior part, such as an instrument panel, a door panel, or a seat.

In various embodiments, the article is made from a composition that contains from 0 mg/m$^3$ to less than 0.01 mg/m$^3$, or less than 0.02 mg/m$^3$, or less than 0.03 mg/m$^3$, or less than 0.05 mg/m$^3$ formaldehyde, as measured in accordance with the VOC Test Method.

In various embodiments, the article is made from a composition that contains equal to or less than 0.05 mg/m$^3$, or equal to or less than 0.04 mg/m$^3$, or equal to or less than 0.03 mg/m$^3$, or equal to or less than 0.02 mg/m$^3$ formaldehyde, as measured in accordance with the formaldehyde abatement test.

In various embodiments, the article is made from a composition that contains equal to or less than 0.430 mg/m$^3$, or equal to or less than 0.420 mg/m$^3$, or equal to or less than 0.400 mg/m$^3$, or equal to or less than 0.380 mg/m$^3$, or equal to or less than 0.350 mg/m$^3$, or equal to or less than 0.330 mg/m$^3$, or equal to or less than 0.300 mg/m$^3$, or equal to or less than 0.290 mg/m$^3$, or equal to or less than 0.280 mg/m$^3$, or equal to or less than 0.270 mg/m$^3$, or equal to or less than 0.260 mg/m$^3$, or equal to or less than 0.250 mg/m$^3$, or equal to or less than 0.240 mg/m$^3$, or equal to or less than 0.230 mg/m$^3$ acetaldehyde, as measured in accordance with the VOC Test Method.

In various embodiments, the article is made from a composition that contains from 0 mg/m$^3$ to less than 0.01 mg/m$^3$, or less than 0.02 mg/m$^3$, or less than 0.03 mg/m$^3$, or less than 0.05 mg/m$^3$ acrolein, as measured in accordance with the VOC Test Method.

In various embodiments, the article is made from a composition that contains less than 0.01 mg/m$^3$ formaldehyde, less than 0.430 mg/m$^3$ acetaldehyde, and/or less than 0.01 mg/m$^3$ acrolein, as measured in accordance with the VOC Test Method, and equal to or less than 0.05 mg/m$^3$ formaldehyde, as measured in accordance with the formaldehyde abatement test. In one or more embodiments, the article is made from a composition that can have one, some, or all of the following properties:

(i) a flexural modulus (Young's modulus) from 1200 MPa, or 1400 MPa, or 1500 MPa to 1600 MPa, or 1700 MPa, or 1800 MPa, or 2000 MPa, as measured in accordance with ISO 178;

(ii) a flexural yield strength from 20 MPa, or 25 MPa, or 29 MPa to 31 MPa, or 35 MPa, or 40 MPa, as measured in accordance with ISO 178;

(iii) a tensile modulus from 1000 MPa, or 1250 MPa, or 1300 MPa, or 1400 Mpa, or 1450 MPa to 1600 MPa, or 1700 MPa, or 1800 MPa, or 2000 MPa, as measured in accordance with ISO 527;

(iv) a tensile yield strength from 18 MPa, or 19 MPa to 21 MPa, or 25 MPa, or 30 MPa, as measured in accordance with ISO 527;

(v) an impact strength (Notched IZOD) at 23° C. from 15 kJ/m$^2$, or 20 kJ/m$^2$, or 30 kJ/m$^2$, or 33 kJ/m$^2$ to 36 kJ/m$^2$, or 40 kJ/m$^2$, or 45 kJ/m$^2$, or 50 kJ/m$^2$, as measured in accordance with ISO 180;

and/or (vi) an impact strength (Notched IZOD) at −30° C. from 2 kJ/m$^2$, or 3.5 kJ/m$^2$, or 4.0 kJ/m$^2$ to 5.0 kJ/m$^2$, or 6.0 kJ/m$^2$, or 8.0 kJ/m$^2$, as measured in accordance with ISO 180.

In various embodiments, the article is made from a composition that has one, at least two, or at least three, or at least four, or at least five, or all of properties (i)-(vi).

The present article may comprise one or more embodiments disclosed herein.

The present compositions and articles advantageously contain a low concentration of aldehydes such as formaldehyde, acetaldehyde, and acrolein, while maintaining or improving upon the mechanical properties necessary for automobile interior parts. Not wishing to be bound by any particular theory, Applicants believe the methylene group(s) within the acetoacetyl group(s) of the acetoacetyl functional polymer reacts with aldehydes present in the composition, such as by a nucleophilic addition reaction, which reduces the aldehyde concentration. An example of the nucleophilic addition reaction is depicted in Equation (1) below, which depicts the abatement of formaldehyde by a polymer comprising two acetoacetyl groups. Such a reaction (i.e., abatement) is not limited to use of two acetoacetyl groups and can also occur with a single acetoacetyl group.

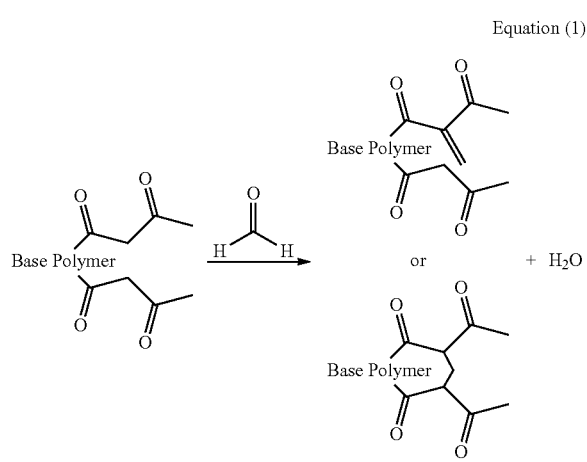

Equation (1)

The acetoacetyl functional polymer reduces the aldehyde concentration of the composition and the article, and may also reduce the aldehyde concentration of other automobile interior parts (such as when the acetoacetyl group reacts with aldehydes present in the interior air of an automobile). Further, the present compositions and articles exhibit a balance between toughness (demonstrated by the tensile impact properties such as IZOD testing) and stiffness (demonstrated by the tensile and flexural properties) that is advantageous for automobile interior parts.

By way of example, and not limitation, examples of the present disclosure are provided.

EXAMPLES

1. Test Methods

Density is measured in accordance with ASTM D792, Method B. The result is recorded in grams (g) per cubic centimeter (g/cc or g/cm$^3$).

Melt flow rate (MFR) is measured in accordance with ASTM D1238, Condition 230° C./2.16 kilogram (kg) weight. The result is recorded in grams (g) eluted per 10 minutes (g/10 min).

Melt index (MI) is measured in accordance with ASTM D1238, Condition 190° C./2.16 kilogram (kg) weight, also known as $I_2$. The result is reported g/10 min.

Notched IZOD Impact Strength is measured in accordance with ISO 180 at room temperature (23° C.) and at −30° C. The result is recorded in kilojoules (kJ) per square meter (kJ/m$^2$).

Flexural modulus (Young's modulus) is measured in accordance with ISO 178. The result is recorded in megaPascal, or MPa.

Flexural yield strength is measured in accordance with ISO 178. The result is recorded in megaPascal, or MPa.

Tensile modulus is measured in accordance with ISO 527. The result is recorded in megaPascal, or MPa.

Tensile yield strength is measured in accordance with ISO 527. The result is recorded in megaPascal, or MPa.

VOC Test Method: Volatile Organic Chemical (VOC) testing is performed in accordance with the "VOC Test Method" described below, which is revised from the Toyota™ gas bag method TSM 0508G. The VOC Test Method described below is supported by priority application no. PCT/CN2017/086488; any changes from PCT/CN2017/086488 would be apparent to one of ordinary skill in the art as typographical or clerical changes without addition of new matter. In the following working examples, samples are prepared by weighing each component and extruding using a Coperon 18 mm extruder. The compounds are granulated into small pellets by a side cutter granulator. The granulated compounds are used for Total Volatile Organic Chemical (TVOC) testing using the VOC Test Method described below.

The VOC Test Method is performed by weighing 200 g of a sample into a 10 liter (L) gas volume Tedlar™ PVF (polyvinyl fluoride) bag (from Delin Co. ltd, China), and then feeding 5 L of nitrogen into the bag. The bag is then stored at 65° C. for two hours before analysis. Further details of the VOC Test Method are discussed below.

Carbonyl analysis is performed with a 4 liter sample from the bag. The sample is derivatized with dinitrophenylhydrazine (DNPH). Then, the carbonyl compounds are extracted and injected into a high-performance liquid chromatography (HPLC) column and separated using gradient elution. The separated compounds are then quantified by UV detection at 360 nm, with a detection limit of 0.01 mg/m$^3$. Carbonyl analysis provides the concentration of aldehydes, such as formaldehyde, acetaldehyde, acrolein, propionaldehyde, and crotonaldehyde present in the sample. Further details of the carbonyl analysis is provided in the paragraph below, as well as the HPLC conditions of Table 1.

DNPH cartridges (CNWBOND DNPH-Silica cartridge, 350 mg, Cat. No. SEEQ-144102, Anple Co. Ltd.) are employed to absorb the carbonyls emitted from the gas bag. The sampling speed is 330 mL/min and the sampling time is 13 min. After absorption, the DNPH cartridges are eluted with 1 gram (precisely weighed) of ACN, and the ACN solution is analyzed by HPLC to quantify the carbonyls in the sample. The standard solution with six DNPH derivatives (TO11A carbonyl-DNPH mix, Cat. No. 48149-U, 15 ppm for each individual compound, Supelco Co. Ltd.) is diluted by acetonitrile, and the final solution (0.794 ppm wt/wt) is restored in a 2 mL vial for instrument calibration at −4° C. (refrigerator). The 0.794 ppm (wt/wt) standard solution is injected into the HPLC system as a one point external standard for quantification of carbonyls in the sample. The first two peaks are identified as formaldehyde and acetaldehyde according to the standard specification. The response factor is calculated for each derivative according to the formula below:

$$\text{Response factor } i = \frac{\text{Peak Area } i}{0.794}$$

Where:
Response factor i=Response factor of derivative i
Peak Area i=Peak Area of derivative i in standard solution
0.794=standard concentration of 0.794 ppm The concentration of the aldehyde-DNPH derivative in the sample solution is calculated based on the formula below:

$$\text{Concentration of } i = \frac{\text{Peak Area } i}{\text{Response factor } i}$$

Where:
Concentration of i=Conc. of aldehyde-DNPH derivative in sample solution
Peak Area i=Peak Area of Derivative i in sample solution
Response factor i=Response factor of derivative i
The HPLC conditions are shown below in Table 1.

TABLE 1

| Instrument: | Agilent 1200 HPLC | | | |
|---|---|---|---|---|
| Column: | Supelco Ascentis Express C18, 15 cm*4.6 mm, 2.7 μm | | | |
| Mobile Phase: | Solvent A: 0.1% $H_3PO_4$ in Acetonitrile (ACN) Solvent B: 0.1% $H_3PO_4$ in DI water | | | |
| Column Oven: | 15° C. | | | |
| Detection: | DAD detector at 360 nm | | | |
| Gradient: | Time (min) | % A | % B | Flow(ml/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 uL | | | |

Formaldehyde Abatement Test by Gas Bag method: With the VOC Test Method, the aldehyde content in the comparative sample and inventive samples is compared. However, the formaldehyde concentration in these samples are lower than the limit of quantification for the VOC Test Method. To further demonstrate the formaldehyde abating capability of the inventive samples, a spiking experiment is designed by spiking a known concentration of formaldehyde into gas bags with different samples in order to compare their formaldehyde abating capabilities. The test procedures are as follows:

An aliquot of 200 g sample is put into a 10 liter (L) gas volume PVF bag, and then 5 L of nitrogen is fed into the bag. Then, an aliquot of 3 μL of 500 ppm formaldehyde standard solution is injected into the gas bag to make a theoretical formaldehyde concentration of 0.3 mg/m3 in the gas bags. The gas bags are then stored at 65° C. for two hours. The formaldehyde analysis is performed with a 4 liter sample from the bag. The gas sample is derivatized with dinitrophenylhydrazine (DNPH) cartridge. The formaldehyde concentration in different gas bags are quantified using the same HPLC method as described in 'VOC Test Method'. The measured formaldehyde concentration in the comparative gas bag is ~0.14 mg/m3, which should be due to the physical absorption of formaldehyde by the sample TPO compositions.

Differential Scanning calorimetry (DSC): Glass transition temperature (Tg) of a polymer is measured by DSC. 5-10 milligram (mg) of a sample is analyzed in a crimped aluminum pan on a TA Instrument DSC Q2000 fitted with an auto-sampler under nitrogen. Tg measurement by DSC is conducted for 3 cycles: $1^{st}$ cycle: from −60° C. to 160° C., 10 degree Celsius per minute (° C./min), and hold for 3 minutes (min); $2^{nd}$ cycle: from 160° C. to −60° C., 10° C./min, hold for 3 min; and $3^{rd}$ cycle: from −60° C. to 160° C., 10° C./min, and hold for 3 min. Tg is obtained from the $3^{rd}$ cycle by the half height method.

Gel Permeation Chromatography (GPC): Molecular weight of a polymer is measured by GPC analysis using Agilent 1200. The sample is dissolved in tetrahydrofuran (THF)/formic acid (FA) (5%) with a concentration of 2 mg/mL and then filtered through 0.45 μm polytetrafluoroethylene (PTFE) filter prior to the GPC analysis. The GPC analysis is conducted using the following conditions:

Column: One PLgel GUARD columns (10 μm, 50×7.5 mm), One Mixed B columns (7.8×300 mm) in tandem; column temperature: 40° C.; mobile phase: THF/FA (5%); flow rate: 1.0 mL/minute; injection volume: 100 μL; detector: Agilent Refractive Index detector, 40° C.; and calibration curve: PL Polystyrene Narrow standards with molecular weights ranging from 2329000 to 580 g/mol, using polynom 3 fitness.

2. Materials

The materials used in the examples are provided in Table 2 below.

TABLE 2

| Material | Description/Properties | Source |
| --- | --- | --- |
| YUPLENE ™ BX3900 | propylene impact copolymer density = 0.90 g/cc (ASTM D792) MFR = 60 g/10 min (ASTM D1238, 230° C./2.16 kg) | SK Global Chemical |
| ENGAGE ™ 8200 | polyolefin elastomer ethylene/octene copolymer density = 0.870 g/cc (ASTM D792) MI = 5 g/10 min (ASTM D792, 190° C./2.16 kg) | The Dow Chemical Company |
| Eastman ™ | acetoacetoxyethyl methacrylate | Eastman |

TABLE 2-continued

| Material | Description/Properties | Source |
| --- | --- | --- |
| AAEM | functional monomer | Chemical Company |
| MMA | methyl methacrylate monomer | The Dow Chemical Company |
| Gelatin | stabilizer | The Dow Chemical Company |
| PDMAC | poly(diallyldimethylammonium chloride), 15 wt % aq. solution stabilizer | The Dow Chemical Company |
| LPO | lauroyl peroxide initiator | The Dow Chemical Company |
| n-DDM | n-Dodecyl Mercaptan chain transfer agent | Sinopharm Chemical Reagent Co. Ltd. (SCRC) |
| JetFil ™ 700 | Talc | IMERYS |
| IRGANOX ™ B 225 | Antioxidant containing a blend of 50 wt % tris(2,4-ditert-butylphenyl)phosphite and 50 wt % pentaerythritol tetrakis[3-[3,5-di-tert-butyl-4-hydroxyphenyl]propionate] | BASF |

3. Protocols a. Preparation of Acetoacetyl Functional Polymers

A one liter, three neck reactor equipped with a condenser, a mechanical stirrer and inlet for nitrogen ($N_2$) is fed with deionized (DI) water (400 g), PDADMAC (13 g) and gelatin (0.3 g). The obtained water phase is heated to 75° C. under a gentle $N_2$ flow. In a separate container, oil phase is prepared by mixing monomers, an initiator, and a chain transfer agent (CTA) if used, based on formulations given in Table 3. Agitation is applied to completely dissolve the initiator. Then the oil phase is added into the water phase under mild agitation (150 rpm). The resultant reaction mixture is then heated up to 85° C. After 30 min, another shot of gelatin (0.3 g) is added into the reactor. The reaction proceeds for 3 hours and further continues at 107° C. for half an hour, which is defined as the oil bath temperature. This is to further boost the conversion of monomers. After that, the reactor is cooled down to room temperature. The microbeads are gravitically settled at the bottom of the flask. The solid beads are collected via filtration and washed repeatedly with MeOH/$H_2O$ solution mixture at a ratio of 1/1 (v/v). The obtained polymer particles are then vacuum-dried at 50° C. overnight. Properties of the polymer are also given in Table 3.

TABLE 3

| Sample | MMA (g) | AAEM (g) | LPO (g) | n-DMM (g) | Temp (° C.) | Tg (° C.) | Particle size * (μm) |
| --- | --- | --- | --- | --- | --- | --- | --- |
| AFP1 | 60 | 60 | 0.6 | 1.2 | 87 | 48.0 | 376.8 |
| AFP2 | 36 | 84 | 0.6 | 1 | 87 | 33.9 | 390.0 |

* Number averaged particle size. Determined by RapidVue particle sizer produced by Beckman Coulter Inc.

b. Preparation of Inventive Examples 1-4 and Comparative Sample 1

The comparative sample and inventive examples are each prepared by weighing each component into a Coperon™ 18 mm extruder and extruding the composition. After extrusion, the composition is granulated into small pellets using a side cutter granulator manufactured by LABTECH Engineering company, Model: LSC-108. Pellets have a diameter of 2.3-3.0 mm and a length of 2.3-3.0 mm. The pellets are then molded into samples for testing. Table 4 shows the amount, in approximate weight percent, of each component included in the inventive example and comparative sample compositions.

The compositions are tested for Volatile Organic Chemicals (VOC) via the VOC Method described above. The compositions are also tested via the formaldehyde abatement test described above. The results are shown in Table 4.

The compositions are also tested for mechanical properties. The results are shown in Table 4.

TABLE 4

|  | CS 1 | Ex. 1 | Ex. 2 | Ex. 3 | Ex. 4 |
|---|---|---|---|---|---|
| Components in phr | | | | | |
| YUPLENE ™ BX3900 (phr) | 75 | 75 | 75 | 75 | 75 |
| ENGAGE ™ 8200 (phr) | 25 | 25 | 25 | 25 | 25 |
| AFP 1 (phr) | — | 0.16 | 0.32 | — | — |
| AFP 2 (phr) | — | — | — | 0.24 | 0.48 |
| JetFil ™ 700 (phr) | 20 | 20 | 20 | 20 | 20 |
| IRGANOX ™ B 225 (phr) | 0.3 | 0.3 | 0.3 | 0.3 | 0.3 |
| Components in approximate Weight Percent | | | | | |
| YUPLENE ™ BX3900 (wt %) | 62.34 | 62.26 | 62.18 | 62.22 | 62.10 |
| ENGAGE ™ 8200 (wt %) | 20.78 | 20.76 | 20.73 | 20.74 | 20.70 |
| AFP 1 (wt %) | — | 0.13 | 0.26 | — | — |
| AFP 2 (wt %) | — | — | — | 0.20 | 0.39 |
| JetFil ™ 700 (wt %) | 16.63 | 16.60 | 16.58 | 16.59 | 16.56 |
| IRGANOX ™ B 225 (wt %) | 0.25 | 0.25 | 0.25 | 0.25 | 0.25 |
| Aldehyde VOC Concentrations via VOC Test Method | | | | | |
| Formaldehyde (mg/m$^3$) | ND | ND | ND | ND | ND |
| Acetaldehyde (mg/m$^3$) | 0.430 | 0.420 | 0.280 | 0.230 | 0.290 |
| Acrolein (mg/m$^3$) | ND | ND | ND | ND | ND |
| Aldehyde VOC Concentrations via Formaldehyde Abatement Test | | | | | |
| Formaldehyde (mg/m$^3$) | 0.14 | 0.02 | 0.05 | 0.03 | 0.04 |
| Mechanical Properties | | | | | |
| Flexural (Young's) Modulus (MPa) | 1625 | 1520 | 1552 | 1495 | 1494 |
| Flexural Yield Strength (MPa) | 29.9 | 29.3 | 30.2 | 29.4 | 29.5 |
| Tensile Modulus (MPa) | 1630 | 1540 | 1590 | 1480 | 1460 |
| Tensile Yield Strength (MPa) | 19.8 | 19.6 | 20.2 | 19.9 | 19.9 |
| Notched IZOD @ 23° C. (10 P) (kJ/m$^2$) | 35.66 | 34.69 | 33.55 | 35.69 | 34.06 |
| Notched IZOD @ −30° C. (10 C) (kJ/m$^2$) | 4.71 | 5.07 | 4.60 | 5.00 | 4.70 |

CS = Comparative Sample.
ND = Not Detectable. A sample with an aldehyde content that is not detectable has an aldehyde content that is less than the detection limit of 0.01 mg/m$^3$ (i.e., from 0 mg/m$^3$ to less than 0.01 mg/m$^3$).

4. Results

As shown in Table 4, Inventive Examples 1-4, which are compositions containing (A) polypropylene (YUPLENE™ BX3900); (B) polyolefin elastomer (ENGAGE™ 8200); (C) acetoacetyl functional polymer; and (D) an additive component including talc (JetFil™ 700) and an antioxidant (IRGANOX™ B 225), advantageously exhibit reduced aldehyde concentrations (e.g., acetaldehyde concentrations) compared to CS 1, which lacks an acetoacetyl functional polymer and is representative of the state of the art.

Without wishing to be bound by any particular theory, Applicant believes the acetoacetyl group reacts with aldehydes (e.g., formaldehyde, acetaldehyde, and acrolein) present in the composition, which advantageously abates (i.e., reduces) the aldehyde concentration of the composition.

Furthermore, Inventive Examples 1-4 surprisingly and unexpectedly exhibit similar, and in some cases improved, mechanical properties compared to CS 1, indicating Examples 1-4 are suitable for making articles such as automobile interior parts.

It is further noted that inventive compositions of the present disclosure are cost effective by limiting the amount of expensive components, such as acetoacetyl functional polymers.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A composition comprising:
   (A) from 50 wt % to 85 wt % of a polypropylene polymer;
   (B) from 5 wt % to 35 wt % a polyolefin elastomer;
   (C) from 0.1 wt % to 20 wt % of an acetoacetyl functional polymer; and
   (D) from 0 wt % to 30 wt % of an additive component.

2. The composition of claim 1, wherein the acetoacetyl functional polymer comprises, as polymerized units, from 21 wt % to 80 wt % of an acetoacetyl functional monomer and from 20 wt % to 79 wt % of an acrylic monomer different from the acetoacetyl functional monomer.

3. The composition of claim 1, wherein the acetoacetyl functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, and mixtures thereof.

4. The composition of claim 1, wherein the acetoacetyl functional polymer is in the form of polymer beads having an average particle size of from 10 to 2000 micrometers.

5. The composition of claim 1, wherein the acetoacetyl functional polymer is prepared by suspension polymerizing a monomer composition in the presence of a chain transfer agent and a stabilizer, wherein the monomer composition comprises, based on total weight of the monomer composition, from 21 wt % to 80 wt % of the acetoacetyl functional monomer and from 20 wt % to 79 wt % of the acrylic monomer different from the acetoacetyl functional monomer.

6. The composition of claim 1 in which the polyolefin elastomer is an ethylene/α-olefin copolymer.

7. The composition of claim 1 comprising less than 0.01 mg/m$^3$ formaldehyde, as measured in accordance with the VOC Test Method, and equal to or less than 0.05 mg/m$^3$ formaldehyde, as measured in accordance with the formaldehyde abatement test.

8. The composition of claim 1 comprising less than 0.430 mg/m$^3$ acetaldehyde, as measured in accordance with the VOC Test Method.

9. The composition of claim 1 comprising less than 0.01 mg/m$^3$ acrolein, as measured in accordance with the VOC Test Method.

10. The composition of claim 1 comprising:
   less than 0.01 mg/m$^3$ formaldehyde, as measured in accordance with the VOC Test Method;
   less than 0.430 mg/m$^3$ acetaldehyde, as measured in accordance with the VOC Test Method; and
   less than 0.01 mg/m$^3$ acrolein, as measured in accordance with the VOC Test Method.

11. The composition of claim 1 comprising:
a flexural modulus (Young's modulus) of greater than 1490 Mpa; and
a flexural yield strength of greater than 29 Mpa.

12. The composition of claim 1 comprising:
a tensile modulus of greater than 1450 MPa; and
a tensile yield strength of greater than 19 MPa.

13. The composition of claim 1 comprising:
an impact strength at 23° C. of greater than 33 kJ/m$^2$; and
an impact strength at −30° C. of greater than 4.50 kJ/m$^2$.

14. An article made from the composition of claim 1.

15. The article of claim 14 in the form of an automobile interior part.

* * * * *